(12) United States Patent
Ishii

(10) Patent No.: US 9,124,817 B2
(45) Date of Patent: Sep. 1, 2015

(54) PROJECTOR AND CONTROL METHOD USED FOR THE SAME

(71) Applicant: CANON KABUSHIKI KAISHA, Tokyo (JP)

(72) Inventor: Atsushi Ishii, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 13/908,776

(22) Filed: Jun. 3, 2013

(65) Prior Publication Data
US 2013/0321782 A1 Dec. 5, 2013

(30) Foreign Application Priority Data

Jun. 5, 2012 (JP) ................................ 2012-128137

(51) Int. Cl.
G03B 21/20 (2006.01)
H04N 9/31 (2006.01)
G03B 21/14 (2006.01)
G03B 21/13 (2006.01)
H04N 5/202 (2006.01)

(52) U.S. Cl.
CPC .............. H04N 9/3197 (2013.01); G03B 21/13 (2013.01); G03B 21/142 (2013.01); H04N 9/3147 (2013.01); H04N 9/3182 (2013.01); H04N 5/202 (2013.01)

(58) Field of Classification Search
CPC . H04N 9/3105; H04N 9/3194; H04N 9/3197; H04N 5/202; H04N 5/3182
USPC ................. 353/30, 31, 69, 84, 85, 94, 98, 99; 348/674, 743–747, E05.074; 349/5, 349/7–9, 72, 199
See application file for complete search history.

(56) References Cited

U.S. PATENT DOCUMENTS

| | | | |
|---|---|---|---|
| 7,237,903 B2 | 7/2007 | Nagayoshi | |
| 8,439,508 B2 * | 5/2013 | Matsuo et al. | 353/119 |
| 2005/0057726 A1 * | 3/2005 | Uehara | 353/30 |
| 2007/0097333 A1 * | 5/2007 | Zavarehi et al. | 353/85 |
| 2007/0139627 A1 * | 6/2007 | Yamada et al. | 353/94 |
| 2011/0043704 A1 * | 2/2011 | Shoji | 348/674 |
| 2011/0050985 A1 * | 3/2011 | Munoz Leo | 348/370 |

FOREIGN PATENT DOCUMENTS

JP 2005-275077 A 10/2005

* cited by examiner

*Primary Examiner* — Sultan Chowdhury
(74) *Attorney, Agent, or Firm* — Canon U.S.A., Inc. IP Division (57) ABSTRACT

A projector includes a shift unit configured to move a projection position of an image, a black adjustment unit configured to make luminance of black in a non-overlapping region, in which an image projected by the projector and an image projected by another projector do not overlap on the projection surface, higher than that in an overlapping region, in which the image projected by the projector and the image projected by the other projector overlap on the projection surface, in such a way as to uniform the luminance of black between the non-overlapping region and the overlapping region, and a control unit configured to move a boundary position in the image between a region where the luminance is adjusted by the black adjustment unit and a region where the luminance is not adjusted, by an amount where the projection position is moved by the shift unit.

10 Claims, 7 Drawing Sheets

PROJECTOR AND CONTROL METHOD USED FOR THE SAME

BACKGROUND OF THE INVENTION

1. Field of the Invention

The present invention relates to a projector and a control method for the projector and, in particular, to shifting the position of a projected image and adjusting the luminance of black.

2. Description of the Related Art

Video image projection using a plurality of projectors has been conventionally performed to increase an information amount and/or brightness in a projected video image. To increase an information amount, for example, a method called multi-projection (or tiling) has been employed in which video images projected by a plurality of projectors are arranged next to one another to form a single large screen.

In such multi-projection, it is hard to arrange the projectors such that the video images projected by adjacent projectors do not overlap with each other at all, and thus, in some cases, adjacent video images are projected to partially overlap with each other. In this case, by adjusting display positions of the video images projected by the respective projectors to project identical video images in an overlapping portion, seams are made less noticeable.

However, when the video images are projected to partially overlap with each other, brightness in a region where the projected video images overlap with each other (hereinafter, referred to as an overlapping region) becomes higher than that in a region where the projected images do not overlap (hereinafter, referred to as a non-overlapping region) even if the identical video images are projected in the overlapping region. This hinders proper viewing. Hereinafter, a bright portion produced in an overlapping region in the aforementioned state will be referred to as a misadjusted black floating pattern.

Accordingly, Japanese Patent Application Laid-Open No. 2005-275077 discusses a multi-projection display device including a plurality of projector units that makes an adjustment to add (increase) luminance in a non-overlapping region, using an auxiliary illumination device.

In addition, there has been also known a projector that includes an image processing function to make an adjustment to add the luminance of black in a non-overlapping region.

Meanwhile, as discussed in U.S. Pat. No. 7,237,903, there is a technique to allow the position of a video image projected on a screen to be adjusted by changing the timing of superimposition of a video signal with respect to vertical and horizontal display periods of a display device.

Figure 7A:
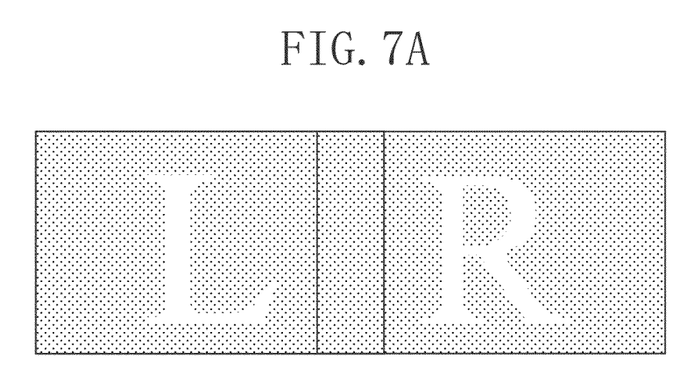
FIGS. 7A and 7B are diagrams illustrating a case where an image shift is performed after a black adjustment is made.
Figure 7B:
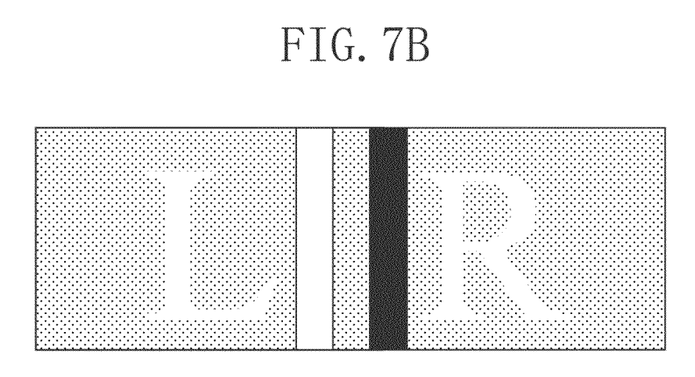

FIG. 7A illustrates an overall projected video image after an adjustment is made to add the luminance of black in a non-overlapping region. FIG. 7B illustrates an overall video image projected when the positions of the video images projected by the individual projectors are shifted, by an image processing function, from the state illustrated in FIG. 7A to the right on the drawing surface of FIG. 7A.

As illustrated in FIG. 7B, the luminance of black in the projected video image becomes uneven if the positions of the projected video images are adjusted by the method discussed in U.S. Pat. No. 7,237,903 after the processing to adjust the luminance of black is carried out by the image processing function to suppress generation of a misadjusted black floating pattern.

SUMMARY OF THE INVENTION

According to an aspect of the present invention, a projector configured to display an image by projecting light modulated by a light modulation element onto a projection surface includes a shift unit configured to move a projection position of the image by changing a position to be used to display the image in the light modulation element, a black adjustment unit configured to make luminance of black in a non-overlapping region, in which an image projected by the projector and an image projected by another projector do not overlap on the projection surface, higher than that in an overlapping region, in which the image projected by the projector and the image projected by the other projector overlap on the projection surface, in such a way as to uniform the luminance of black between the non-overlapping region and the overlapping region, and a control unit configured to move a boundary position in the image between a region in which the luminance of black is adjusted by the black adjustment unit and a region in which the luminance of black is not adjusted by the black adjustment unit, by an amount of movement in which the projection position is moved by the shift unit.

According to another aspect of the present invention, a method for controlling a projector configured to display an image by projecting light modulated by a light modulation element onto a projection surface includes moving a projection position of the image by changing a position to be used to display the image in the light modulation element, increasing luminance of black in a non-overlapping region in which an image projected by the projector and an image projected by another projector do not overlap on the projection surface in such a way as to uniform the luminance of black between the non-overlapping region and an overlapping region in which the image projected by the projector and the image projected by the other projector overlap on the projection surface, and controlling a boundary position between a region in which the luminance of black is adjusted and a region in which the luminance of black is not adjusted not to be changed on the projection surface before and after the projection position of the image is moved.

According to an exemplary embodiment of the present invention, even if processing to change the position of a projected video image is carried out after an adjustment to uniform the luminance of black between a overlapping region and a non-overlapping region is made, unevenness of luminance of black in an entire projected video image can be suppressed.

Further features and aspects of the present invention will become apparent from the following description of exemplary embodiments with reference to the attached drawings.

DESCRIPTION OF THE EMBODIMENTS

Figure 1:
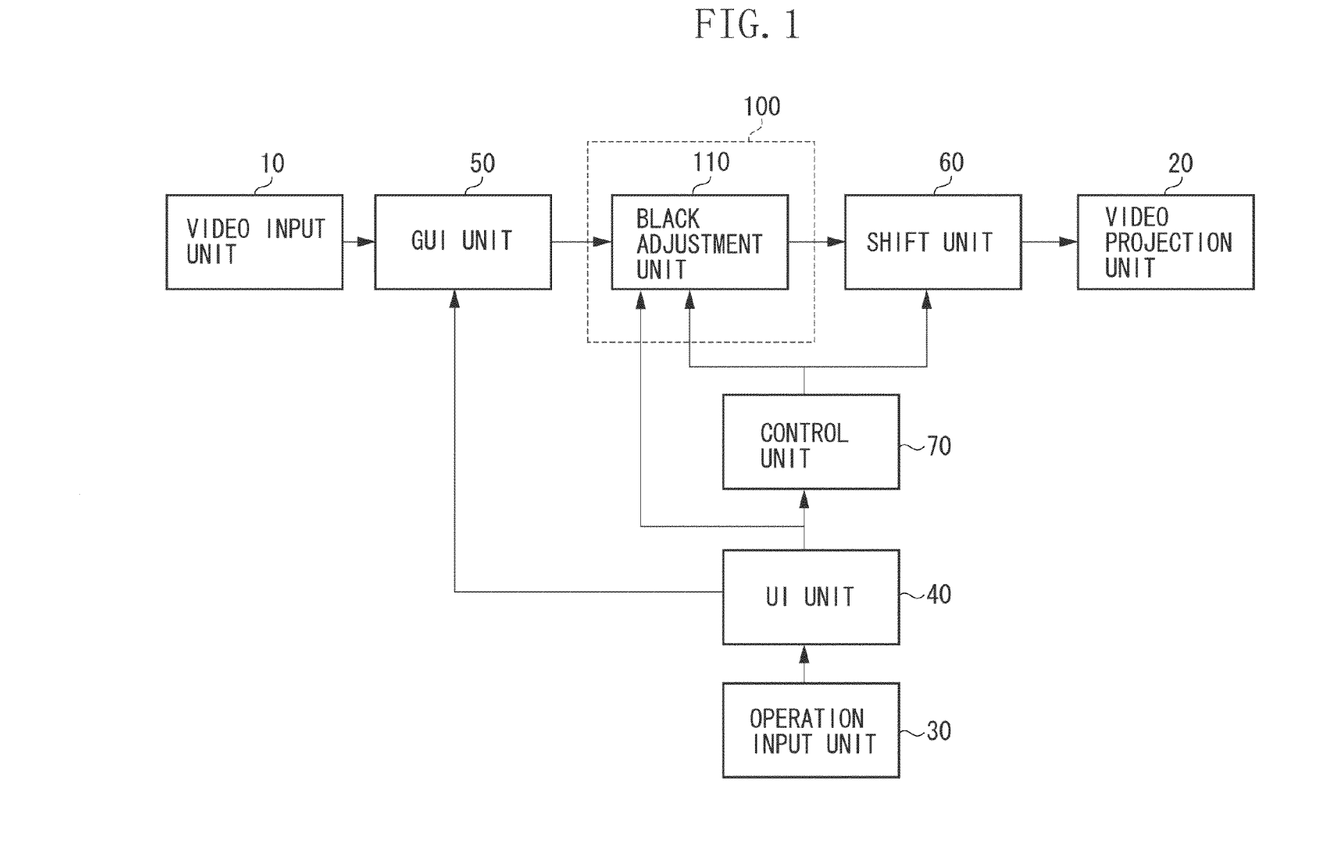
FIG. 1 is a block diagram illustrating a configuration of a projector according to an exemplary embodiment of the present invention.

Hereinafter, a projector according to an exemplary embodiment of the present invention will be described with reference to FIG. 1.

A video signal is input to a video input unit 10 from an external personal computer (PC) or the like. The video input unit 10 is provided with terminals such as a composite terminal and a high definition multimedia interface (HDMI) terminal through which the video signal is input to the video input unit 10, a receiver integrated circuit (IC) to receive the video signal input through the terminals, and so on. The video input unit 10 further includes circuits to carry out resolution conversion and interlace progressive (IP) conversion and a frame memory. Thus, the video input unit 10 can convert video signals in various formats into video signals in desired formats.

A graphical user interface (GUI) unit 50 draws various images in accordance with control of a user interface (UI) unit 40 and superimposes a drawn image onto a video signal. The GUI unit 50, for example, superimposes menu screens to make various settings for an image, such as a screen for adjusting brightness of an overall video signal and a screen for adjusting the luminance of black in a non-overlapping region in the case of multi-projection.

The video signal output from the GUI unit 50 is subjected to various types of image processing in an image processing unit 100. Then, a display position of the video signal is adjusted in a shift unit 60, and the video signal is projected through a video projection unit 20.

The image processing unit 100 includes a black adjustment unit 110. The image processing unit 100 may further include another processing unit to execute various image processing functions.

Figure 2A:
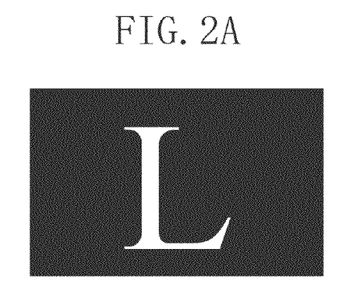
FIGS. 2A, 2B, 2C, 2D, and 2E are diagrams illustrating a black adjustment to uniform luminance between an overlapping region and a non-overlapping region.
Figure 2B:
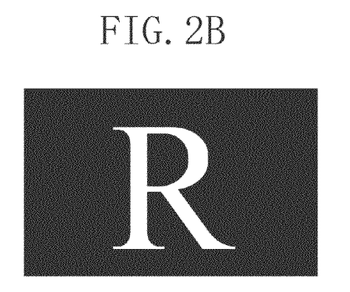
Figure 2C:
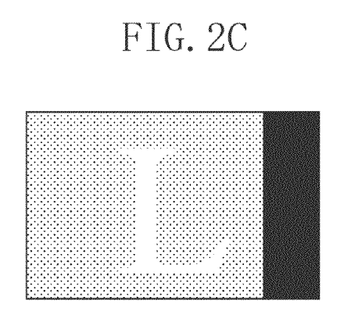
Figure 2D:
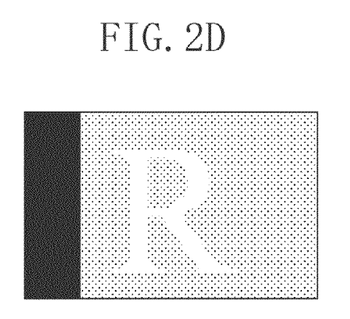
Figure 2E:
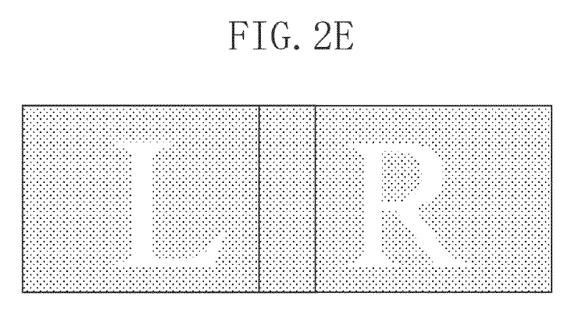

The black adjustment unit 110 offsets a video signal level in some region and can make an adjustment only in a direction in which the signal level is added (a direction in which the luminance is increased). This function only allows a signal level of a non-overlapping region to be offset (i.e., to increase the luminance) when, for example, video signals as illustrated in FIGS. 2A and 2B are to be superimposed to generate video signals as illustrated in FIGS. 2C and 2D. Through this, a video signal as illustrated in FIG. 2E in which the luminance is uniformed between an overlapping region and a non-overlapping region can be projected with multi-projection.

The shift unit 60 changes the position to be used to display a video image in a liquid crystal panel (a light modulation element), to thereby move the projection position of the video image. For example, the shift unit 60 makes an adjustment to change the superimposition of the video signal supplied to the video projection unit 20 with respect to vertical and horizontal display periods of a display device. Specifically, the shift unit 60 shifts horizontal and vertical blanking widths (or the position of an effective region) of the video signal by an amount corresponding to a desired shift position. Hereinafter, this processing may be referred to as an image shift.

The video projection unit 20 includes a liquid crystal panel, a panel drive IC, a lamp, and a projection lens. The video projection unit 20 modulates a video signal transmitted from the image processing unit 100 in the liquid crystal panel and projects the modulated light onto a projection surface by a projection optical system.

An operation input unit 30 includes an infrared reception unit, a control signal reception terminal, and a microcomputer for recognizing various pieces of received information as an operation input. The operation input unit 30 constantly monitors presence/absence of an operation input, and upon receiving an operation input, the operation input unit 30 immediately notifies the UI unit 40 of the operation input information through communication.

The UI unit 40 carries out various controls on the GUI unit 50 and the image processing unit 100 based on operation input information transmitted from the operation input unit 30. When the UI unit 40 receives an operation input to start making settings for image processing, the UI unit 40 controls the GUI unit 50 to superimpose, onto a video signal, a menu screen in which setting items for carrying out the image processing are arranged.

Further, upon receiving an operation input for selecting a setting item for specific image processing in the displayed menu screen, the UI unit 40 switches the display to a menu screen for making settings for that image processing. Then, upon receiving an operation input for a setting change in that image processing, the UI unit 40 controls the image processing unit 100 in accordance with that setting and also displays the content of the changed setting in the menu screen.

Figure 3:
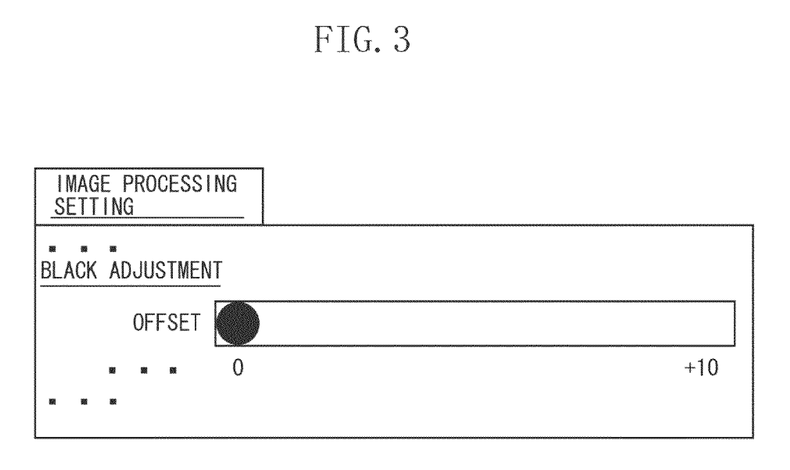
FIG. 3 is a diagram illustrating a menu screen for an offset setting relevant to a black adjustment.

Here, since the black adjustment unit 110 can offset a signal level only in a direction in which the signal level is added (increased), a menu screen as illustrated in FIG. 3 for making settings for an offset with the black adjustment unit 110 is displayed.

Figure 4:
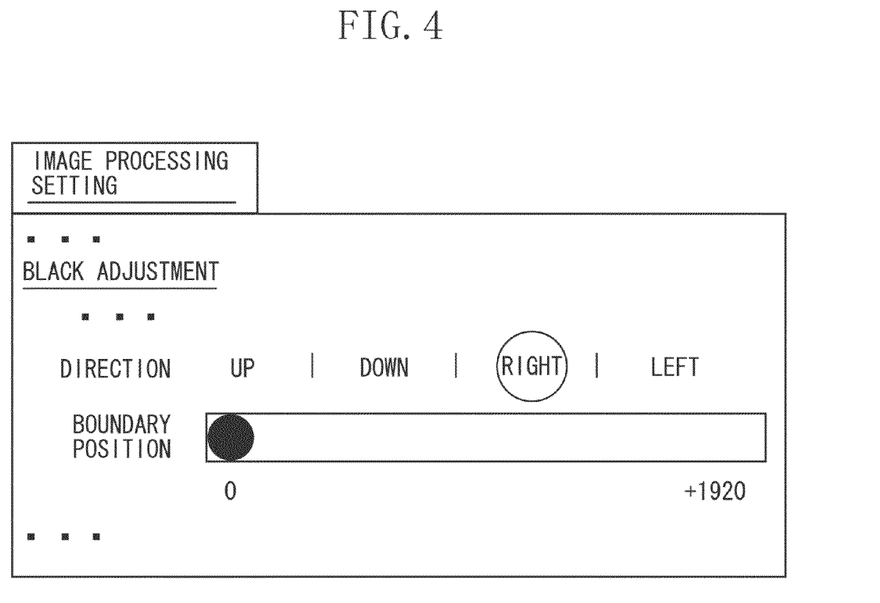
FIG. 4 is a diagram illustrating a menu screen for a boundary position setting relevant to a black adjustment.

Further, a menu screen as illustrated in FIG. 4 is displayed as a menu screen for making settings for a boundary between an overlapping region and a non-overlapping region in the black adjustment unit 110. The menu screen illustrated in FIG. 4 is a screen for a black adjustment in multi-projection using two projectors. Actual setting procedures carried out by a user are as follows. First, the user operates the menu screen illustrated in FIG. 4 to select one of up, down, left, and right sides of a video image projected by a currently operated projector, thereby determining the side where the video image is to be overlapped with another video image projected by another projector. Further, the user sets the width of an overlapping region, that is, the boundary position between the overlapping region and the non-overlapping region. Thereafter, the menu screen illustrated in FIG. 3 is displayed, and the user sets an offset amount of the luminance of black. In the menu screen illustrated in FIG. 3 according to the exemplary embodiment, a state where a parameter indicating that an offset is 0 is a state where the black adjustment is not carried out.

Figure 5:
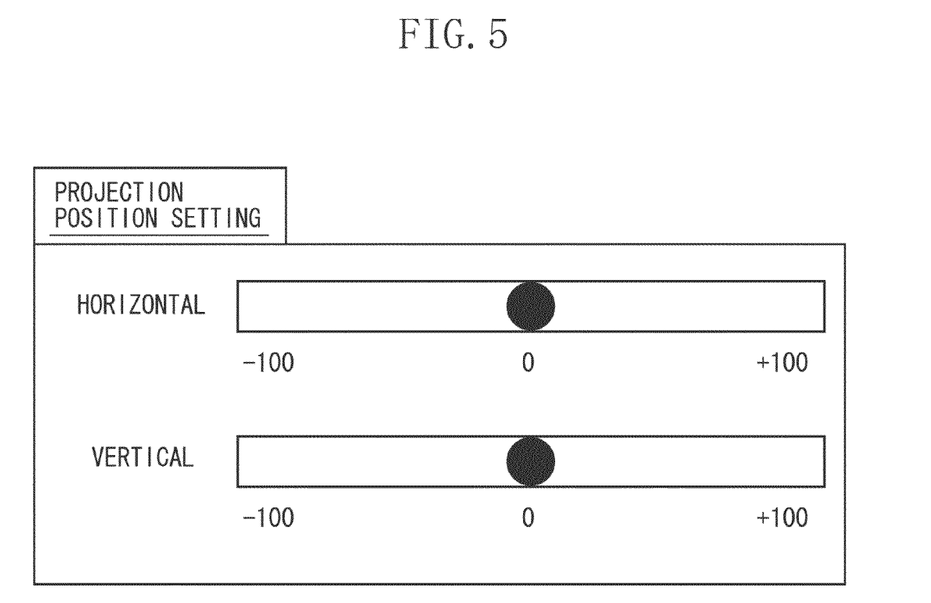
FIG. 5 is a diagram illustrating a menu screen for a projection position setting.

Upon receiving a setting operation input pertaining to an image shift (position adjustment of the projected video image) through the menu screen illustrated in FIG. 4, the UI unit 40 controls the GUI unit 50 to superimpose, onto the video signal, an image illustrated in FIG. 5 as a menu screen for carrying out the image shift.

Then, upon receiving an operation input to change the position setting of the projected video image through the menu screen illustrated in FIG. 5, the UI unit 40 notifies a control unit 70 of the changed setting and also displays the content of the changed setting in the menu screen.

Here, when the black adjustment is not set in the black adjustment unit 110, the control unit 70 only changes the position setting of the video image in the shift unit 60. On the other hand, when the black adjustment is set in the black adjustment unit 110, the control unit 70 changes the position setting of the video image in the shift unit 60 and also changes the boundary position setting in the black adjustment unit 110 by a movement amount corresponding to a difference in the changed set value. In other words, the control unit 70 changes the set value in the black adjustment unit 110 in a direction to cancel the shift. That is, the control unit 70 moves the boundary position within the video image in the black adjustment unit 110 by a movement amount corresponding to an image shift amount of the shift unit 60. In other words, the control unit 70 carries out control so that the boundary position between a region in which the luminance is adjusted by the black adjustment unit 110 and a region in which the luminance is not adjusted is not to be changed on a projection surface, before and after the projection position of the video image is moved by the shift unit 60.

Thus, even if the shift unit 60 performs the image shift to move the projection position of the video image after the black adjustment unit 110 makes settings to make a misadjusted black floating pattern less noticeable, the boundary position does not need to be reset in the black adjustment unit 110, thereby improving the convenience. Further, even if the projected video images are shifted in the same direction in individual projectors in multi-projection, generation of a misadjusted black floating pattern in the projected image is suppressed, and thus a video image with even luminance of black can be projected.

Figure 6:
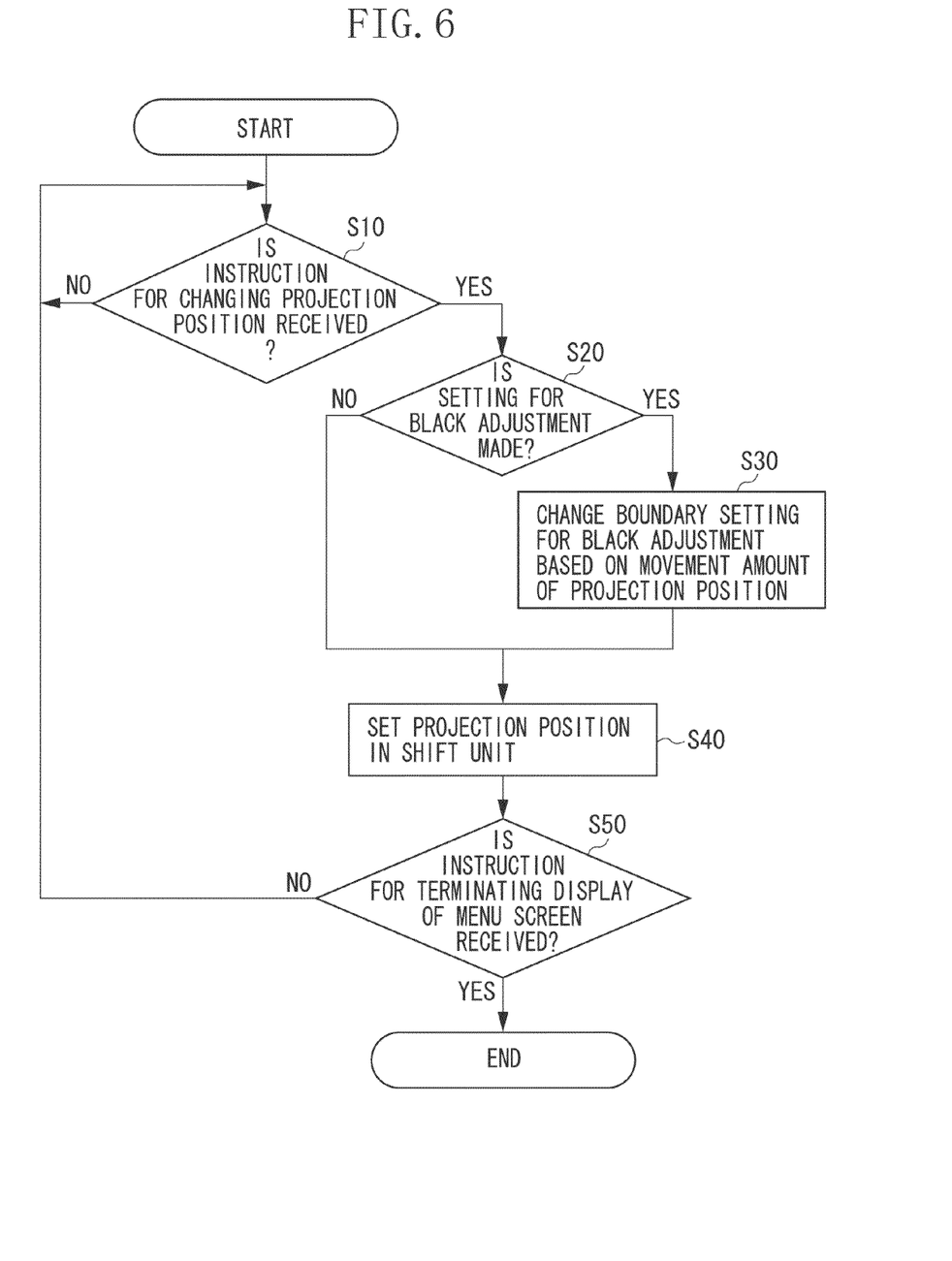
FIG. 6 is a flowchart illustrating processing according to an exemplary embodiment.

FIG. 6 illustrates a flowchart of control processing on the shift unit 60 and the black adjustment unit 110 carried out by the control unit 70. The control unit 70 carries out this processing in accordance with a computer program (control program). The flow illustrated in FIG. 6 starts in a state where the menu screen illustrated in FIG. 5 for making settings for the shift unit 60 is displayed.

As the processing starts, in step S10, the control unit 70 stands by until the control unit 70 is notified of an operation input from the operation input unit 30. If the control unit 70 receives an instruction for changing the projection position setting through the operation input unit 30, the processing proceeds to step S20. Otherwise, the control unit 70 stands by in step S10.

In step S20, the control unit 70 determines whether the black adjustment unit 110 is set to offset the luminance of black. If the black adjustment unit 110 is not set to offset the luminance of black, the processing proceeds to step S40, and if the black adjustment unit 110 is set to offset the luminance of black, the processing proceeds to step S30.

In step S30, the control unit 70 causes the black adjustment unit 110 to change the boundary position setting between the overlapping region and the non-overlapping region. This setting change is carried out based on an instruction for changing the projection position setting notified as an operation input, and the boundary position between a region in which the signal level is offset in the black adjustment unit 110 and a region in which the signal level is not offset is changed, through the setting change, by an amount equal to the movement amount of the projection position. Then, the processing proceeds to step S40.

In step S40, the control unit 70 makes settings for the shift unit 60 to change the projection position based on the instruction for changing the projection position notified as the operation input.

In step S50, the control unit 70 determines whether an instruction for terminating the menu screen display is received. If the instruction for terminating the menu screen display is not received, the processing returns to step S10. If the instruction for terminating the menu screen display is received, the control unit 70 ends this flow.

Thus far, the exemplary embodiment of the present invention have been described, but the present invention is not limited to the above-described exemplary embodiment, and various modifications and variations can be made within the scope of the spirit of the present invention. In the above-described exemplary embodiment, the timing at which the control unit 70 changes the boundary position setting in the black adjustment unit 110 is the timing at which the control unit 70 changes the projection position setting in the shift unit 60. However, the timing of changing the boundary position setting may be set otherwise. A setting screen to re-adjust the boundary position may be displayed in a menu after the projection position is changed, and the boundary position may be re-adjusted at the timing at which an operation input that instructs the re-adjustment is received from the user in that state.

Further, the configuration may be such that the GUI unit 50 and the shift unit 60 are included in the image processing unit 100 of the above-described exemplary embodiment. In addition, the order in which the image processing unit 100 and the GUI unit 50 carry out processing may be reversed, and the GUI unit 50 may include another image processing function.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2012-128137 filed Jun. 5, 2012, which is hereby incorporated by reference herein in its entirety.

What is claimed is:

1. A projector configured to display an image by projecting light modulated by a light modulation element onto a projection surface, the projector comprising:
   a shift unit configured to move a projection position of the image by changing a position to be used to display the image in the light modulation element;
   a black adjustment unit configured to make luminance of black in a non-overlapping region, in which an image projected by the projector and an image projected by another projector do not overlap on the projection surface, higher than that in an overlapping region, in which the image projected by the projector and the image projected by the other projector overlap on the projection surface, in such a way as to uniform the luminance of black between the non-overlapping region and the overlapping region; and
   a control unit configured to move a boundary position in the image between a region in which the luminance of black is adjusted by the black adjustment unit and a region in which the luminance of black is not adjusted by the black adjustment unit, by an amount of movement in which the projection position is moved by the shift unit,
   wherein the shift unit is configured to move the projection position of the image by changing a timing of superimposition of a video signal supplied to the light modulation element with respect to vertical and horizontal display periods of the light modulation element.

2. The projector according to claim 1, wherein the black adjustment unit is configured to increase the luminance of black only in the non-overlapping region.

3. The projector according to claim 1, wherein the luminance is a level of a video signal.

4. The projector according to claim 1, further comprising:
   a display unit configured to display a menu screen to set an adjustment amount by the black adjustment unit.

5. The projector according to claim 1, further comprising:
   a display unit configured to display a menu screen to set a boundary between the overlapping region and the non-overlapping region.

6. A method for controlling a projector configured to display an image by projecting light modulated by a light modulation element onto a projection surface, the method comprising:
- moving a projection position of the image by changing a position to be used to display the image in the light modulation element;
- increasing luminance of black in a non-overlapping region in which an image projected by the projector and an image projected by another projector do not overlap on the projection surface in such a way as to uniform the luminance of black between the non-overlapping region and an overlapping region in which the image projected by the projector and the image projected by the other projector overlap on the projection surface;
- controlling a boundary position between a region in which the luminance of black is adjusted and a region in which the luminance of black is not adjusted not to be changed on the projection surface before and after the projection position of the image is moved; and
- moving the projection position of the image by changing a timing of superimposition of a video signal supplied to the light modulation element with respect to vertical and horizontal display periods of the light modulation element.

7. The method according to claim 6, further comprising:
- increasing the luminance of black only in the non-overlapping region.

8. The method according to claim 6, wherein the luminance is a level of a video signal.

9. The method according to claim 6, further comprising:
- displaying a menu screen to set an adjustment amount in increasing the luminance of black.

10. The method according to claim 6, further comprising:
- displaying a menu screen to set a boundary between the overlapping region and the non-overlapping region.

* * * * *